US 9,505,269 B2

(12) United States Patent
Kudo (10) Patent No.: US 9,505,269 B2
(45) Date of Patent: Nov. 29, 2016

(54) PNEUMATIC TIRE WITH TREAD HAVING CENTRAL MAIN GROOVE, SHOULDER MAIN GROOVES AND SIPES

(75) Inventor: Daisuke Kudo, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 1303 days.

(21) Appl. No.: 13/413,824

(22) Filed: Mar. 7, 2012

(65) Prior Publication Data

US 2012/0227881 A1   Sep. 13, 2012

(30) Foreign Application Priority Data

Mar. 8, 2011  (JP) ................................. 2011-050543

(51) Int. Cl.
*B60C 11/12* (2006.01)
*B60C 11/00* (2006.01)
*B60C 11/03* (2006.01)

(52) U.S. Cl.
CPC ........ *B60C 11/0083* (2013.04); *B60C 11/0306* (2013.04); *B60C 11/1259* (2013.04); *B60C 11/12* (2013.01); *B60C 2011/0344* (2013.04); *B60C 2011/0369* (2013.04); *B60C 2011/0372* (2013.04); *B60C 2011/0395* (2013.04); *B60C 2011/1209* (2013.04); *B60C 2011/1295* (2013.04)

(58) Field of Classification Search
CPC ................. B60C 11/0083; B60C 2011/1295; B60C 11/12
See application file for complete search history.

(56) References Cited

U.S. PATENT DOCUMENTS 5,803,999 A * 9/1998 Shibata ............... B60C 11/0083
152/209.14

FOREIGN PATENT DOCUMENTS

| JP | 4-27604 A | | 1/1992 |
| JP | DE-4447417 A1 | * | 7/1996 |
| JP | 2000-185526 A | * | 7/2000 |
| JP | 2003-146015 A | | 5/2003 |
| JP | 2008-037139 A | * | 2/2008 |

OTHER PUBLICATIONS machine translation for Japan 2008-037139 (no date).*
machine translation for Japan 2000-185526 (no date).*
machine translation for German 4,447,417 (no date).*

* cited by examiner

*Primary Examiner* — Steven D Maki
(74) *Attorney, Agent, or Firm* — Birch, Stewart, Kolasch & Birch, LLP (57) ABSTRACT

A pneumatic tire is provided with center blocks defined by a central main groove, shoulder main grooves and central axial grooves, and shoulder blocks defined by the shoulder main grooves, shoulder axial grooves and the tread edges. The tread profile comprises a center arc of a radius of 250 to 550 mm and a shoulder arc of a smaller radius and has a camber quantity of 5.5 to 9.0 mm. The center blocks and shoulder blocks are provided with sipes each having an axially outer open end and an axially inner closed end disposed at specific positions in relation to the axially inwardly adjacent main grooves. The total sipe number on the shoulder blocks is more than the total sipe number on the center blocks.

9 Claims, 4 Drawing Sheets

PNEUMATIC TIRE WITH TREAD HAVING CENTRAL MAIN GROOVE, SHOULDER MAIN GROOVES AND SIPES

BACKGROUND OF THE INVENTION

The present invention relates to a pneumatic tire, more particularly to a tread pattern suitable for passenger cars capable of improving the rolling resistance without sacrificing the steering stability.

Recently, in view of resource saving and global environmental problems, pneumatic tires are strongly required to decrease the rolling resistance. The rolling resistance can be decreased by decreasing the energy loss in various rubber components of a tire. For that purpose, conventionally employed are: to use elastomeric materials having low heat generation property as the tread rubber; and to decrease the volume of the rubber component such as tread rubber, sidewall rubber and the like. However, if the volume of the tread rubber and/or sidewall rubber is decreased, the noise performance during running, ride comfort and the like are liable to deteriorate. If a tread rubber having a low heat generation property is used, the braking performance and steering stability are liable to deteriorate. Thus, the reduction of rolling resistance has antinomic relationship with the steering stability, braking performance and the like.

SUMMARY OF THE INVENTION

It is therefore, an object of the present invention to provide a pneumatic tire, in which the rolling resistance is reduced without sacrificing the steering stability.

According to the present invention, a pneumatic tire is provided in the tread portion with a central main groove extending continuously in the tire circumferential direction and disposed on the tire equator or alternatively on each side of the tire equator, a shoulder main groove extending continuously in the tire circumferential direction and disposed on each side of the tire equator and axially outside the central main groove, central axial grooves extending from the central main groove to the shoulder main groove and arranged at intervals in the tire circumferential direction, shoulder axial grooves extending from the shoulder main groove to the adjacent tread edge and arranged at intervals in the tire circumferential direction so that, on each side of the tire equator, a plurality of center blocks are formed between the central main groove and the shoulder main groove, and a plurality of shoulder blocks are formed between the shoulder main groove and the tread edge, wherein in a meridian section of the tire under its normally-inflated unloaded condition, a profile of the tread portion comprises a center arc having a radius of curvature of 250 to 550 mm and a shoulder arc having a radius of curvature smaller than that of the center arc so that the tire has a round shoulder and a radial distance between points on the tread profile at the tire equator and the tread edge, respectively, is in a range of from 5.5 to 9.0 mm, the center block is provided with a center sipe, wherein the center sipe extends from its axially inner end to the shoulder main groove, and the axially inner end is positioned at an axial distance of 5 to 35% of the axial width of the center block, axially outwardly from an axial outer edge of the central main groove, the shoulder block is provided with a shoulder sipe, wherein the shoulder sipe extends axially outwardly from its axially inner end beyond the tread edge, and the axially inner end is positioned at an axial distance of 10 to 40% of the axial block width of the shoulder block, axially outwardly from the axial outer edge of the shoulder main groove, and the total number of the shoulder sipes is more than the total number of the center sipes.

Further, the pneumatic tire according to the present invention may be provided with the following optional features:

even when a tread wear reaches to 50% of the depth of the shoulder main groove, the shoulder sipe still extends axially outwardly beyond the tread edge;

a radial distance between the axially outer end of the shoulder sipe and a maximum tire diameter position is 10 to 20% of the tire section height;

the radius of curvature of the shoulder arc is 25 to 40 mm;

the angle of the center sipe with respect to the tire circumferential direction gradually decreases toward the tire equator, and at the axially inner end of the center sipe, the angle is 10 to 50 degrees; and/or at least at the axial position corresponding to the center of the axial width of the center block, the angle of the center sipe with respect to the tire circumferential direction is less than the angle of the central axial groove with respect to the tire circumferential direction.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflate to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used.

The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like.

The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The "tread edges" used herein are the axial outermost edges Te of the ground contacting patch (camber angle=0) in the normally inflated loaded condition.

The undermentioned "tread width" is the axial distance between the tread edges measured in the normally inflated unloaded condition of the tire.

The undermentioned "camber quantity" means the radial distance between two points on the outer surface 2A of the tread portion 2 at the tire equator C and the tread edge Te.

The term "groove width" means the width measured perpendicularly to the widthwise center line of the groove.

The term "angle" of a groove means that of the widthwise center line of the groove.

DESCRIPTION OF THE PREFERRED EMBODIMENTS

Embodiments of the present invention will now be described in detail in conjunction with the accompanying drawings.

In the drawings, pneumatic tire 1 according to an embodiment of the present invention comprises a tread portion 2, a pair of sidewall portions 3, a pair of axially spaced bead portions 4 each with a bead core 5 therein, a carcass 6 extending between the bead portions 4 through the tread portion 2 and sidewall portions 3, and a belt disposed radially outside the carcass in the tread portion.

In this embodiment, the tire 1 is a passenger car tire suitable for running on well-paved roads.

The carcass 6 is composed of at least one ply 6A of carcass cords arranged radially at an angle in the range of from 75 to 90 degrees with respect to the tire equator C, extending between the bead portions 4 through the tread portion 2 and sidewall portions 3 and turned up around the bead core 5 in each bead portion 4 from the axially inside to the axially outside of the tire so as to form a pair of turnup portions 6b and a main portion 6a therebetween. In this embodiment, the carcass 6 is composed of a single ply 6A of the carcass cords arranged radially at an angle of 90 degrees with respect to the tire equator C. For the carcass cords, organic fiber cords are used for example.

The belt comprises a breaker 7 and optionally a band (not shown).

The breaker 7 comprises: at least two cross plies 7A and 7B of high modulus cords laid at an angle of from 15 to 45 degrees with respect to the tire equator C. For the breaker cords, steel cords and/or high modulus organic fiber cords can be used. In this example, the breaker consists of the two cross breaker plies 7A and 7B.

The band is composed of a cord or cords wound on the radially outside of the breaker at a small angle of at most about 5 degrees for example almost zero degree with respect to the tire equator C.

Figure 1:
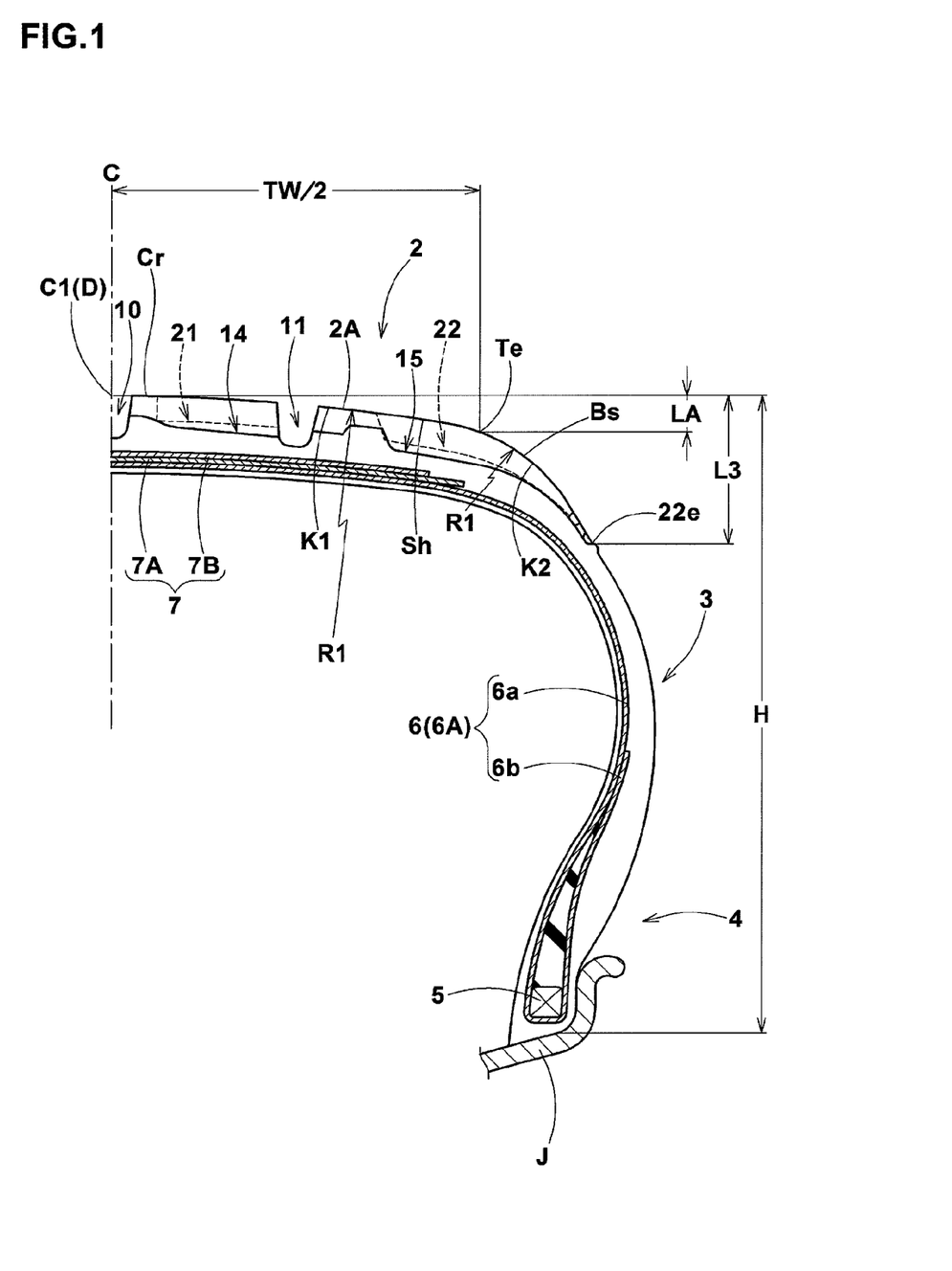
FIG. 1 is a cross sectional view of a pneumatic tire according to an embodiment of the present invention taken along line X-X in FIG. 2.

As shown in FIG. 1, the tire 1 has a round shoulder.

In the meridian section of the tire under the normally-inflated unloaded condition, the outer surface 2A of the tread portion 2 is provided with a tread profile defined by a center arc K1 and a shoulder arc K2 on each side of the shoulder arc K2.

The center arc K1 extends from the tire equator C to near the tread edges Te, forming a tread central region cr.

The shoulder arc K2 extends axially outwardly and radially inwardly from the center arc K1 while defining a buttress surface Bs and the outer surface of a part of the tread shoulder region Sh. The buttress surface Bs is the outer surface of a radially outermost part (so called buttress portion) of the sidewall portion 3 adjacent to the tread edge. No inflection point is formed between the shoulder arc K2 and the center arc K1.

The center arc K1 is a circular arc whose center is located on the tire equatorial plane C so as to be radially outwardly convex.

The radius R1 of the center arc K1 is set in a range of not less than 250 mm, preferably not less than 300 mm, but not more than 550 mm, preferably not more than 450 mm in order to uniform the ground pressure in the tread central region Cr and to improve the steering stability.

If the radius R1 of the center arc K1 is less than 250 mm, then the ground pressure in the tread central region Cr becomes uneven, and the steering stability is deteriorated. If the radius R1 exceeds 550 mm, then the ground pressure decreases in the tread central region Cr than in the tread shoulder region Sh, and the steering stability deteriorates and the aquaplaning resistance is decreased.

The shoulder arc K2 is radially outwardly convex and merges into the outer surface of the main part of the sidewall portion.

The shoulder arc K2 has a radius of curvature R2 of less than the radius R1. Not to hinder or to further the uniform ground pressure distribution in the tread central region Cr, the radius of curvature R2 is preferably set in a range of not less than 25 mm, more preferably not less than 30 mm, but not more than 40 mm, more preferably not more than 38 mm.

According to the present invention, by using the center arc K1 and shoulder arc K2 in combination, the camber quantity LA is increased in comparison with conventional values, and the camber quantity LA is set in a range of not less than 5.5 mm, preferably not less than 6.0 mm, but not more than 9.0 mm, preferably not more than 8.5 mm.

Thereby, the ground pressure is relatively decreased in the tread shoulder region Sh, and as a result, the friction against the road surface during rolling is decreased. Accordingly, the energy loss in the tread shoulder region decreases, and the rolling resistance can be decreased. Further, the drainage in the tread shoulder region Sh can be improved.

If the camber quantity LA is less than 5.5 mm, then it becomes difficult to decrease the energy loss. If the camber quantity LA is more than 9.0 mm, then the ground pressure is excessively decreased in the shoulder region Sh, and the steering stability and wear resistance are deteriorated.

Figure 2:
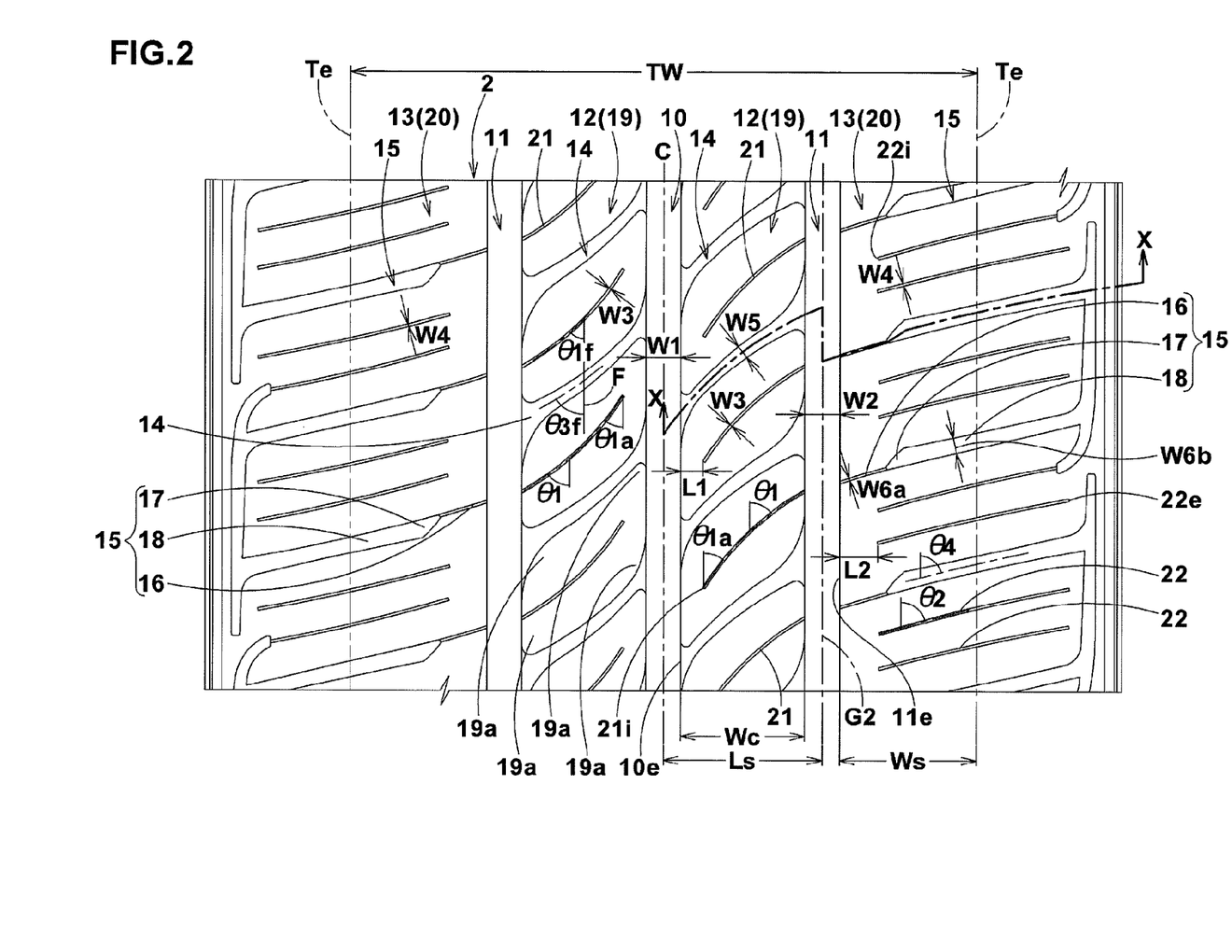
FIG. 2 is a developed partial view of the tread portion thereof.

The tread portion 2 is provided with: a shoulder main groove 11 disposed on each side of the tire equator C and extending continuously in the tire circumferential direction, and a central main groove 10 disposed axially inside the shoulder main groove 11 and extending continuously in the tire circumferential direction. In this embodiment, as shown in FIG. 2, the central main groove 10 is disposed on the tire equator C. Namely, a single central main groove 10 is provided. However, according to another aspect of the present invention, the central main groove 10 can be disposed on each side of the tire equator. In any case, the tread portion 2 is divided into a pair of center land portions 12 each formed between the central main groove 10 and the shoulder main groove 11, and a pair of shoulder land portions 13 each formed between the shoulder main groove 11 and tread edge Te.

Each of the central main groove 10 and shoulder main grooves 11 in this embodiment is formed as a straight groove whose groove edges are each arranged in line in the tire circumferential direction in order to prevent instability behavior such as wobble and drifting of the car when apply the brake and thereby to improve the steering stability.

In the case of passenger car tires, in view of the drainage and tread rigidity, the groove width W1 and groove depth D1 of the central main groove 10 and the groove width W2 and groove depth D2 of the shoulder main groove 11 are preferably set as follows: the groove widths W1 and W2 are 3.0 to 8.0% of the tread width TW, and the groove depths D1 and D2 are about 6.4 to 8.8 mm.

As to the positions of the central main groove 10 and shoulder main groove 11, it is preferable that the widthwise center line of the central main groove 10 is positioned on the tire equator c, and the widthwise center line G2 of the shoulder main groove 11 is positioned at an axial distance Ls of 20 to 30% of the tread width TW, from the tire equator C in order to improve the rigidity balance between the center land portion 12 and shoulder land portion 13 and thereby to improve the steering stability.

On each side of the tire equator C, the center land portion 12 is provided with central axial grooves 14 which are arranged at intervals in the tire circumferential direction and extend from the central main groove 10 to the shoulder main groove 11 while inclining to one circumferential direction; and the shoulder land portion 13 is provided with shoulder axial grooves 15 which are arranged at intervals in the tire circumferential direction and extend from the above-mentioned shoulder main groove 11 to the tread edge Te while inclining to one circumferential direction which is the same as the inclining direction of the central axial grooves 14. Thus, the center land portion 12 is divided into a circumferential row of substantially parallelogram center blocks 19 defined by the grooves 10, 11 and 14. The shoulder land portion 13 is divided into a circumferential row of substantially parallelogram shoulder blocks 20 defined by the grooves 11, 15 and the tread edge Te.

In this embodiment, as shown in FIG. 2, both end portions of the central axial groove 14 are gradually increased in the groove width W5 towards both ends thereof. And the four corners 19a of each of the parallelogram center blocks 19 are rounded in the top view of the block. Therefore, between the main groove 10 and the central axial grooves and between the main groove 11 and the central axial grooves, the resistance to water flow is decreased and the wet performance can be improved.

Preferably, the angle θ3 of the central axial groove 14 with respect to the tire circumferential direction is set in a range of not less than 20 degrees, more preferably not less than 25 degrees, but not more than 70 degrees, more preferably not more than 65 degrees. If the angle θ3 is more than 70 degrees, then the above-mentioned resistance to water flow is increased, and wet performance especially high-speed wet performance is liable to deteriorate. If the angle θ3 is less than 20 degrees, then as the center block 19 is decreased in the lateral stiffness (rigidity), there is a possibility that the steering stability and uneven wear resistance are deteriorated.

The shoulder axial groove 15 in this embodiment comprises: a narrow width part 16 extending from the shoulder main groove 11 and having the narrowest groove width, a gradually-increasing-width part 17 extending from the narrow width part 16 and having a groove width gradually increasing toward the axially side, and a constant width part 18 extending from the gradually-increasing-width part 17 to the tread edge Te (in this embodiment beyond the tread edge Te) and having a substantially constant groove width in order that the rigidity of the axially inner part of the shoulder block 20 is maintained while providing drainage toward the tread edge Te.

For that purpose, the angle θ4 of the shoulder axial groove 15 is preferably set in a range of not less than 60 degrees, more preferably not less than 65 degrees, but not more than 90 degrees, more preferably not more than 85 degrees with respect to the tire circumferential direction.

Figure 3:
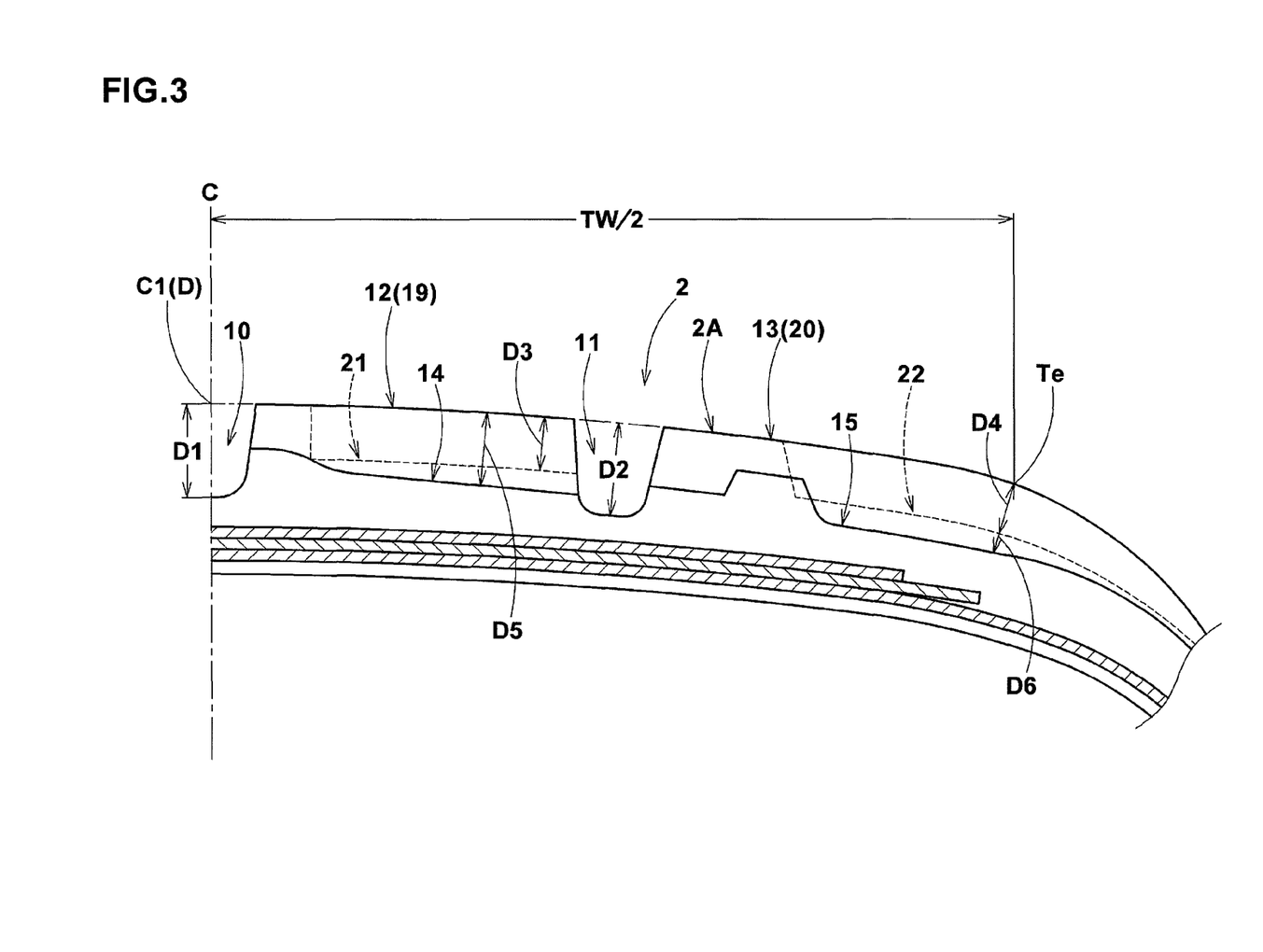
FIG. 3 is a cross sectional view of the tread portion.

In view of the drainage and the rigidity of the center land portion 12 and shoulder land portion, it is preferable that:

the groove width W5 of a constant width part of the central axial groove 14 between the above-mentioned end portions having the gradually increasing width is preferably 2.0 to 6.0 mm;

the groove width W6b of the constant width part 18 of the shoulder axial grooves 15 is preferably 2.0 to 6.0 mm;

the groove width W6a of the narrow width part 16 of the shoulder axial groove 15 is preferably about 0.5 to 1.5 mm;

the groove depth D5 of the central axial groove 14 is preferably 60 to 95% of the groove depth D2 of the shoulder main groove 11; and the groove depth D6 of the shoulder axial groove 15 measured at the tread edge Te is preferably 60 to 95% of the groove depth D2 of the shoulder main groove 11.

According to the present invention, each of the center blocks 19 is provided with a center sipe 21.

The center sipe 21 is connected to the shoulder main groove 11 to have an open end. The center sipe 21 has a closed inner end 21i at an axial distance L1 of 5 to 35% of the axial block width Wc of the center block 19, axially outwardly from the axial outer edge 10e of the central main groove 10. Preferably, the axial distance L1 is not less than 10%, but not more than 30% of the block width Wc.

Further, each of the shoulder blocks 20 is provided with a shoulder sipe 22. The shoulder sipe 22 extends axially outwardly beyond the tread edge Te and terminates in the buttress part. The shoulder sipe 22 has a closed inner end 22i at an axial distance L2 of 10 to 40% of the axial block width Ws of the shoulder block 20, axially outwardly from the axial outer edge lie of the shoulder main groove 11. Preferably, the axial distance L2 is not less than 15%, but not more than 35% of the block width Ws.

The width W3 of the center sipe 21 and the width W4 of the shoulder sipe 22 are set in a range of not less than 0.3 mm, preferably not less than 0.5 mm, but not more than 1.5 mm, preferably not more than 1.2 mm.

The sipe depth D3 of the center sipe 21 and the sipe depth D4 of the shoulder sipe 22 are set in a range of not less than 50%, preferably not less than 60%, but not more than 100%, preferably not more than 98% of the groove depth D2 of the shoulder main groove 11.

Figure 4:
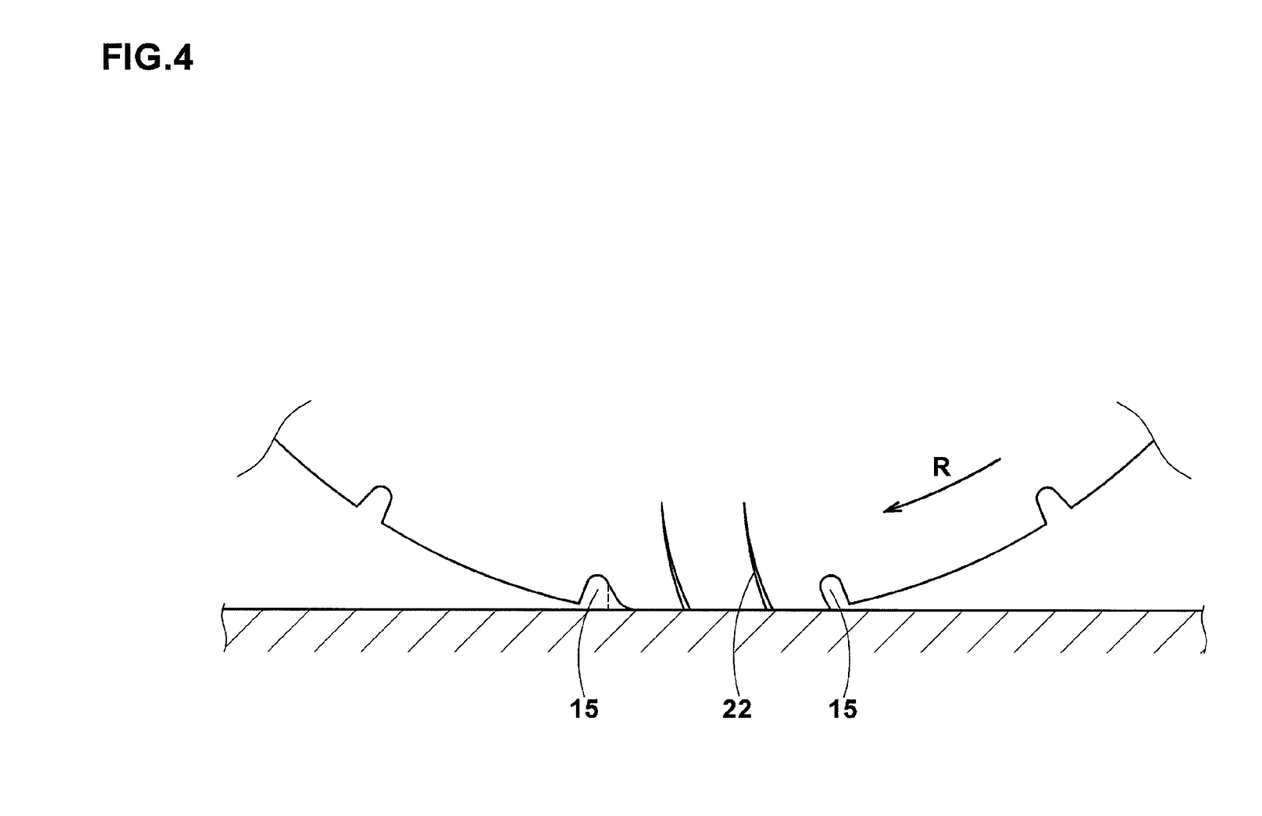
FIG. 4 is a diagram for explaining the effect to control deformation of blocks.

Therefore, the rigidity of each block 19 and 20 is decreased in its axially outer part while maintained in its axially inner part. This facilitate the leaning (deformation) of the axially outer part of the block toward the direction opposite to the tire rotational direction R as shown in FIG. 4. As a result, the internal energy loss caused in the block by resisting the leaning is decreased, and thereby the rolling resistance can be improved without sacrificing the steering stability.

Further, as the shoulder sipe 22 extends beyond the tread edge Te, the energy loss is decreased in the buttress part for the same reason as above. Thus, the rolling resistance can be further improved. Furthermore, by the sipes 21 and 22, the edge effect is increased, therefore, the braking performance, steering stability and the like can be improved.

If the distance L1 is less than 5% of the block width Wc or the distance L2 is less than 10% of the block width Ws, then the rigidity in the axially inner part of the block 19, 20 becomes insufficient, and the steering stability is liable to deteriorate. If the distance L1 is more than 35% of the block width Wc or the distance L2 is more than 40% of the block width Ws, then it becomes difficult to decrease the energy loss.

When counted on each side of the tire equator C, the total number Ss of the shoulder sipes 22 is more than the total number Sc of the center sipes 21. In this embodiment, each of the center blocks 19 is provided with one sipe 21, and each of the shoulder blocks 20 is provided with two sipes 22.

Thereby, the rigidity of the center blocks 19 is increased more than that of the shoulder blocks 20 to provide improved steering stability.

As the friction of the shoulder block 20 against the road surface during rolling is relatively small, the rigidity may be decreased more than the center blocks 19. Thereby, the energy loss due to deformation is effectively decreased. This further improves the rolling resistance.

It is preferable that, in each block row, the center sipes 21 are inclined to the same direction as the central axial grooves 14, and the inclination angle θ1 with respect to the tire circumferential direction is gradually decreased toward the tire equator C to have an arc-like curved configuration. Preferably, the angle θ1 of the center sipe 21 is set in a range of not less than 10 degrees, more preferably not less than 15 degrees, but not more than 50 degrees, more preferably not more than 45 degrees. Especially, at the axially inner end 21i of the center sipe 21, it is preferable that the angle θ1a is a range of not less than 10 degrees, more preferably not less than 15 degrees, but not more than 45 degrees, more preferably not more than 40 degrees. Therefore, the edges of the center sipes 21 can be provided with a sufficient axial component while maintaining the rigidity of the center blocks 19 in the axial and circumferential directions. Thereby, the straight running stability and wet performance can be improved in a well balanced manner.

Further, in order to decrease the total energy loss in the center block 19, it is preferable that, at the axial position F corresponding to the axial center of the block width Wc and in the vicinity area thereof, preferably as broader area as possible, the angle θ1f of the center sipe 21 with respect to the tire circumferential direction is less than the angle θ3f of the central axial groove 14 with respect to the tire circumferential direction. Furthermore, in order to prevent uneven wear, the angle difference θ3f-θ1f is preferably set in a range of not less than 3 degrees, more preferably not less than 5 degrees, but not more than 50 degrees, more preferably not more than 45 degrees. Especially, it is preferable that the angle difference θ3f-θ1f is gradually increased from the axial outside to the axially inside because the axially inner part is subjected to deforming forces in various directions more than the axially outer part.

In order to achieve stable cornering, the angle θ2 of the shoulder sipe 22 is preferably set in a range of not less than 60 degrees, more preferably not less than 65 degrees, but not more than 90 degrees, more preferably not more than 85 degrees with respect to the tire circumferential direction.

As shown in FIG. 1, the radial distance L3 between the axially outer end 22e of the shoulder sipe 22 and the maximum tire diameter position D (in this embodiment, the equator point C1) is preferably set in a range of not less than 10%, more preferably not less than 12%, but not more than 20%, more preferably not more than 18% of the tire section height H in order to reduce deformation of the buttress part during running and thereby further improve the rolling resistance.

If the distance L3 exceeds 20%, then the support for the sidewall portion 3 is decreased and there is a possibility that the apparent stiffness of the sidewall portion 3 becomes insufficient and further the resistance to external injury is liable to decrease.

It is preferable that even when the tread portion 2 is uniformly worn out and the tread wear reaches to 50% of the groove depth D2 of the shoulder main groove 11 (hereinafter the 50% wear state), the shoulder sipe 22 still extends axially outwardly beyond the tread edge Te. Namely, the shoulder sipe 22 has such depth and extent. Therefore, even if a half tread wear life is past, the shoulder sipes 22 can reduce the rolling resistance. In order to improve the rolling resistance and steering stability in a well balanced manner, in this 50% wear state, the axial distance L2a of the axially inner end of the shoulder sipe 22 from the axial outer edge 11e of the shoulder main groove 11 is preferably set in a range of not less than 20%, more preferably not less than 25%, but not more than 40%, more preferably not more than 35% of the block width Ws.

In the present invention, the tread elements such as the above-mentioned grooves, sipes and blocks may be arranged around the tire according to a variable pitching method as well known in the art. In this embodiment, the tread pattern is substantially symmetrical about any point on the tire equator C aside from dislocations of the tread elements due to the variable pitching method. Therefore, the tread pattern in this embodiment is a bidirectional pattern. It is however, the tread pattern may be a unidirectional pattern. In other words, the tread pattern is symmetrical about the tire equator C or the tread pattern is essentially symmetrical about the tire equator C except that one half of the tread pattern on one side of the tire equator is circumferentially sifted from the other half by about a half pitch.

Further, it is also possible to dispose the central main groove 10 on each side of the tire equator C, forming a central land portion along the tire equator c. The central land portion may be formed as a circumferentially continuous straight rib or a row of blocks.

Comparison Tests

Pneumatic tires of size 195/65R15 for passenger cars having the tread pattern shown in FIG. 1 were prepared and tested. The specifications are shown in Table 1.
Common specifications are as follows.
Tread width TW: 146 mm
Center Main Groove
    groove width W1: 5.5% of TW
    groove depth D1: 8.2 mm
    angle: 0 degrees WRT the tire equator
    position: on the tire equator
Shoulder Main Groove
    groove width W2: 5.5% of TW
    groove depth D2: 8.2 mm
    angle: 0 degrees WRT the tire equator
    position Ls: 25% of TW
Center Sipe
    width W3: 0.6 mm
    sipe depth D3: 71% of D2
    maximum angle θ1m: 62 degrees WRT circumferential direction Shoulder Sipe
    width W4: 0.6 mm
    sipe depth D4: 71% of D2
    angle θ2: 72-73.5 degrees WRT circumferential direction
Central Axial Groove
    groove width W5: 5.8-6.6 mm
    groove depth D5: 71-80% of D2
    angle θ3: 50-60 degrees WRT circumferential direction
Shoulder Axial Groove
    groove width W6: 6.6 mm
    groove depth D6: 80% of D2
    angle θ4: 67-72 degrees WRT circumferential direction
<Rolling Resistance Test>

Using a rolling resistance tester including a 1.7 m dia. tire drum, the test tire mounted a wheel rim of size 6.07 J×15 and inflated to 230 kPa was run at a speed of 60 km/hr under a tire load of 4.24 kN, and the rolling resistance was measured. The results are indicated in Table 1 by using an index based on the comparative example tire Ref.1 being 100, wherein the larger the value, the better the rolling resistance.

<Steering Stability Test>

Japanese-made 1500 cc FF passenger car provided on the four wheels with test tires (tire pressure 200 kPa) was run on a dry asphalt road of a tire test course, and the test driver evaluated the steering stability based on the steering response, rigidity, grip and the like.

The results are indicated in Table 1 by using an index based on the comparative example tire Ref.1 being 100, wherein the larger the value, the better the performance.

<Wet Braking Performance Test>

During the above-mentioned car was running at 50 km/hr on a wet asphalt road of a straight tire test course covered with 5 mm depth water, the car was suddenly braked to lock all the wheels, and the distance to stop was measured.

As the test results, the reciprocal of the distance is indicated in Table 1 by using an index based on the comparative example tire Ref.1 being 100, therefore, the larger the value, the better the wet braking performance.

<Wear Resistance Test>

The above-mentioned car was run for 3000 km on public highway and expressway. Then, at each of ten circumferential positions around the tire, the central main groove and shoulder main groove were measured for the groove depth to obtain their difference (absolute value). The average of the obtained ten absolute values was calculated for each test tire. As the test results, the reciprocal of the average is indicated in Table 1 by using an index based on the comparative example tire Ref.1 being 100, therefore, the larger the value, the better the wear resistance.

From the test results, it was confirmed that the tires as embodiments of the present invention were significantly improved in the various performances in comparison with comparative example tires.

TABLE 1

| Tire | Ref. 1 | Ex. 1 | Ex. 2 | Ex. 3 | Ex. 4 | Ref. 2 | Ref. 3 | Ex. 5 |
|---|---|---|---|---|---|---|---|---|
| Center arc radius R1 (mm) | 240 | 400 | 250 | 300 | 450 | 560 | 400 | 400 |
| Shoulder arc radius R2 (mm) | 32 | 32 | 32 | 32 | 32 | 32 | 32 | 32 |
| Shoulder sipe | | | | | | | | |
| axial distance L2/Ws (%) | 30 | 30 | 30 | 30 | 30 | 30 | 3 | 10 |
| radial distance L3/H (%) | 15 | 15 | 15 | 15 | 15 | 15 | 15 | 15 |
| Center sipe | | | | | | | | |
| angle θ1a @ inner end (deg.) | 35 | 35 | 35 | 35 | 35 | 35 | 35 | 35 |
| Rolling resistance | 100 | 105 | 102 | 102 | 102 | 95 | 105 | 105 |
| Steering stability | 100 | 105 | 102 | 103 | 100 | 95 | 100 | 103 |
| Wet braking performance | 100 | 110 | 105 | 105 | 108 | 104 | 100 | 102 |
| Uneven wear resistance | 100 | 108 | 100 | 100 | 100 | 98 | 100 | 102 |

| Tire | Ex. 6 | Ex. 7 | Ref. 4 | Ex. 8 | Ex. 9 | Ex. 10 | Ex. 11 | Ex. 12 |
|---|---|---|---|---|---|---|---|---|
| Center arc radius R1 (mm) | 400 | 400 | 400 | 400 | 400 | 400 | 400 | 400 |
| Shoulder arc radius R2 (mm) | 32 | 32 | 32 | 32 | 32 | 32 | 32 | 32 |
| Shoulder sipe | | | | | | | | |
| axial distance L2/Ws (%) | 15 | 40 | 50 | 30 | 30 | 30 | 30 | 30 |
| radial distance L3/H (%) | 15 | 15 | 15 | 8 | 10 | 12 | 18 | 25 |
| Center sipe | | | | | | | | |
| angle θ1a @ inner end (deg.) | 35 | 35 | 35 | 35 | 35 | 35 | 35 | 35 |
| Rolling resistance | 105 | 98 | 95 | 90 | 101 | 102 | 105 | 105 |
| Steering stability | 104 | 108 | 102 | 105 | 105 | 105 | 102 | 100 |
| Wet braking performance | 106 | 100 | 100 | 110 | 110 | 110 | 110 | 110 |
| Uneven wear resistance | 106 | 102 | 102 | 106 | 108 | 108 | 106 | 100 |

| Tire | Ex. 13 | Ex. 14 | Ex. 15 | Ex. 16 | Ex. 17 | Ex. 18 | Ex. 19 | Ex. 20 |
|---|---|---|---|---|---|---|---|---|
| Center arc radius R1 (mm) | 400 | 400 | 400 | 400 | 400 | 400 | 400 | 400 |
| Shoulder arc radius R2 (mm) | 20 | 25 | 40 | 45 | 32 | 32 | 32 | 32 |
| Shoulder sipe | | | | | | | | |
| axial distance L2/Ws (%) | 30 | 30 | 30 | 30 | 30 | 30 | 30 | 30 |
| radial distance L3/H (%) | 15 | 15 | 15 | 15 | 15 | 15 | 15 | 15 |
| Center sipe | | | | | | | | |
| angle θ1a @ inner end (deg.) | 35 | 35 | 35 | 35 | 5 | 15 | 40 | 50 |
| Rolling resistance | 100 | 100 | 105 | 105 | 103 | 104 | 107 | 104 |

TABLE 1-continued

| Steering stability | 106 | 105 | 100 | 100 | 100 | 100 | 100 | 100 |
| Wet braking performance | 105 | 109 | 110 | 110 | 115 | 110 | 106 | 102 |
| Uneven wear resistance | 105 | 108 | 98 | 90 | 100 | 105 | 105 | 103 |

H: tire section height
Ws: axial width of shoulder block

The invention claimed is:

1. A pneumatic tire comprising a tread portion,
the tread portion having a tread profile comprising a center arc having a radius of curvature of 250 to 550 mm and a shoulder arc having a radius of curvature smaller than that of the center arc so that the tire has a round shoulder and a radial distance between points on the tread profile at the tire equator and the tread edge, respectively, is in a range of from 5.5 to 9.0 mm,
the tread portion being provided with circumferentially continuously extending grooves which include
a central main groove extending continuously in the tire circumferential direction and disposed on the tire equator, and
a shoulder main groove extending continuously in the tire circumferential direction and disposed on each side of the tire equator and axially outside the central main groove,
the tread portion being further provided with
a plurality of central axial grooves extending from said central main groove to said shoulder main groove,
a plurality of shoulder axial grooves extending from said shoulder main groove to the adjacent tread edge
so that, on each side of the tire equator,
a plurality of center blocks are formed between the central main groove and the shoulder main groove, and
a plurality of shoulder blocks are formed between the shoulder main groove and the tread edge,
wherein
the center blocks are each provided with a single center sipe, wherein the center sipe extends from its axially inner end to the shoulder main groove, and the axially inner end is positioned at an axial distance of 5 to 35% of the axial width of the center block, axially outwardly from an axial outer edge of the central main groove,
the shoulder blocks are each provided with two shoulder sipes, wherein each shoulder sipe extends axially outwardly from its axially inner end beyond the tread edge, and the axially inner end is positioned at an axial distance of 10 to 40% of the axial block width of the shoulder block, axially outwardly from the axial outer edge of the shoulder main groove,
the total number of the shoulder sipes is more than the total number of the center sipes, and
the central axial grooves, the shoulder axial grooves, the center sipes and the shoulder sipes are inclined with respect to the tire axial direction in the same direction.

2. The pneumatic tire according to claim 1, wherein each of the shoulder sipes has a depth of more than 50% of the depth of the shoulder main grooves so that even when a tread wear reaches to 50% of the depth of the shoulder main groove, each shoulder sipe extends axially outwardly beyond the tread edge.

3. The pneumatic tire according to claim 2, wherein a radial distance between the axially outer end of each of the shoulder Sipes and a maximum tire diameter position is 10 to 20% of the tire section height.

4. The pneumatic tire according to claim 1, wherein a radial distance between the axially outer end of each of the shoulder sipes and a maximum tire diameter position is 10 to 20% of the tire section height.

5. The pneumatic tire according to claim 1, wherein the radius of curvature of the shoulder arc is 25 to 40 mm.

6. The pneumatic tire according to claim 1, wherein the angle of each of the center sipes with respect to the tire circumferential direction gradually decreases toward the tire equator, and at the axially inner end of the center sipe, the angle is 10 to 50 degrees.

7. The pneumatic tire according to claim 1, wherein in each of the center blocks, at least at the axial position corresponding to the center of the axial width of the center block, the angle of the center sipe with respect to the tire circumferential direction is less than the angle of the adjacent central axial groove with respect to the tire circumferential direction.

8. The pneumatic tire according to claim 1, wherein both end portions of each of the central axial grooves are gradually increased in the groove width towards both ends thereof so that the center blocks each have a substantial parallelogram shape whose four corners are rounded.

9. The pneumatic tire according to claim 1, wherein each of the central main groove and the shoulder main grooves is a straight groove.

* * * * *